Aug. 8, 1933.  H. WARREN  1,921,058

MANUFACTURE OF BOOTS AND SHOES

Filed Nov. 20, 1930  3 Sheets-Sheet 3

INVENTOR.
Harold Warren
By his Attorney
Harlow M. Davis

Patented Aug. 8, 1933

1,921,058

UNITED STATES PATENT OFFICE 1,921,058

MANUFACTURE OF BOOTS AND SHOES

Harold Warren, Swampscott, Mass., assignor to United Shoe Machinery Corporation, Paterson, N. J., a Corporation of New Jersey Application November 20, 1930
Serial No. 496,959

14 Claims. (Cl. 164—90)

This invention relates to the manufacture of shoes, and is herein illustrated as embodied in a machine for operating on boot and shoe parts to enable subsequent operations to be performed with greater accuracy and facility.

It has been proposed in Letters Patent of the United States No. 1,706,504, granted March 26, 1929 upon the application of George E. Warren to provide jig holes at predetermined locations in the parts of a shoe so that successive shoemaking operations can be performed accurately with a minimum of skill. If, for example, a shoe upper is to be prepared for bottoming by molding the toe end of the upper, then the location of the upper in the molding apparatus can be predetermined with great accuracy by the employment of jig holes near the margins of the tip and the vamp, and certain shoemaking advantages definitely insured. For example, the tip line will always be at just the right distance from the toe end of the shoe, and the angle of the tip line will be exactly that desired. Moreover, the position of the tip line upon both of the shoes of a pair will necessarily be the same. Another advantage of this mode of operation is the fact that less lasting allowance or material for the overlasted margin of the upper needs to be provided. Furthermore, this provision of jig holes permits the tip to be joined to a short vamp with exactly the right amount of overlap and at just the desired angle.

An object of the present invention is to provide an improved machine by means of which location marks, such as the jig holes mentioned above, may be readily applied to the tips and vamps of a lot of shoes accurately and with a minimum of skill.

The jig holes are preferably located near the corners at the rear edge of the tip and near the corners of the forward edge of a short vamp. Quite obviously, the distance between the holes will vary with the size of the shoe for which the parts are intended. Accordingly, the illustrated machine is of the type embodying relatively movable tool carriers with gages supported for movement therewith and having operator-controlled means for shifting the gages and tools, such as punches, to enable the location of the punched holes to be effected quickly and very accurately. In machines of that type no account has been taken of the fact that different lasting allowances may be provided upon pieces of work of the same size for shoes of different styles. Accordingly, a feature of the invention resides in the provision of means for adjusting the position of the gages with respect to the operating tools, such as punches, to take care of this variation. Preferably, and as illustrated, the arrangement is such that the gages associated with the respective tools may be simultaneously adjusted equally and oppositely with respect to the tool carriers with which said gages move.

With some styles of work pieces, gaging by the corners of the pieces is not possible, and the curved lateral edges of the pieces do not permit of accurate positioning of a piece merely by engagement with those edges. Still another feature of the invention resides in a machine having not only movable tools and edge gages but also a throat gage which is arranged to be simultaneously adjusted as said tools and edge gages are moved in and out. With variations of work of the nature of that just mentioned, the steps between successive positions of the throat gage are of varying lengths and the illustrated machine provides adjustable means for determining the amount of movement of the throat gage between successive sizes.

In the illustrated machine, in accordance with still other features of the invention, the tools are mounted in U-shaped tool carriers in the outer free ends of the arms of which are supported punches, one arm being also slotted to provide for the retention of a gage support adjustable therein. The illustrated gage supports are interconnected by bell cranks and resiliently urged toward an outward position which is determined by a stop screw. By operating this screw the machine may be adapted for parts having different lasting allowances. The illustrated gages are in the form of notched plates and, inasmuch as the exact shape of the notch varies according to the style of the shoe part to be operated upon, it is desirable to mount the gages in such a way that they may be readily interchanged. Accordingly, each of the illustrated gages has dowels by means of which it may be positioned upon the gage support, and a headed screw passing through a slot in the gage is utilized for securely clamping it in position. The illustrated arrangement is such that the headed screw abuts the other arm of the U-shaped tool carrier before it can be completely removed, thus avoiding loss of the screws and enabling quicker interchange of the gages.

Figure 1:
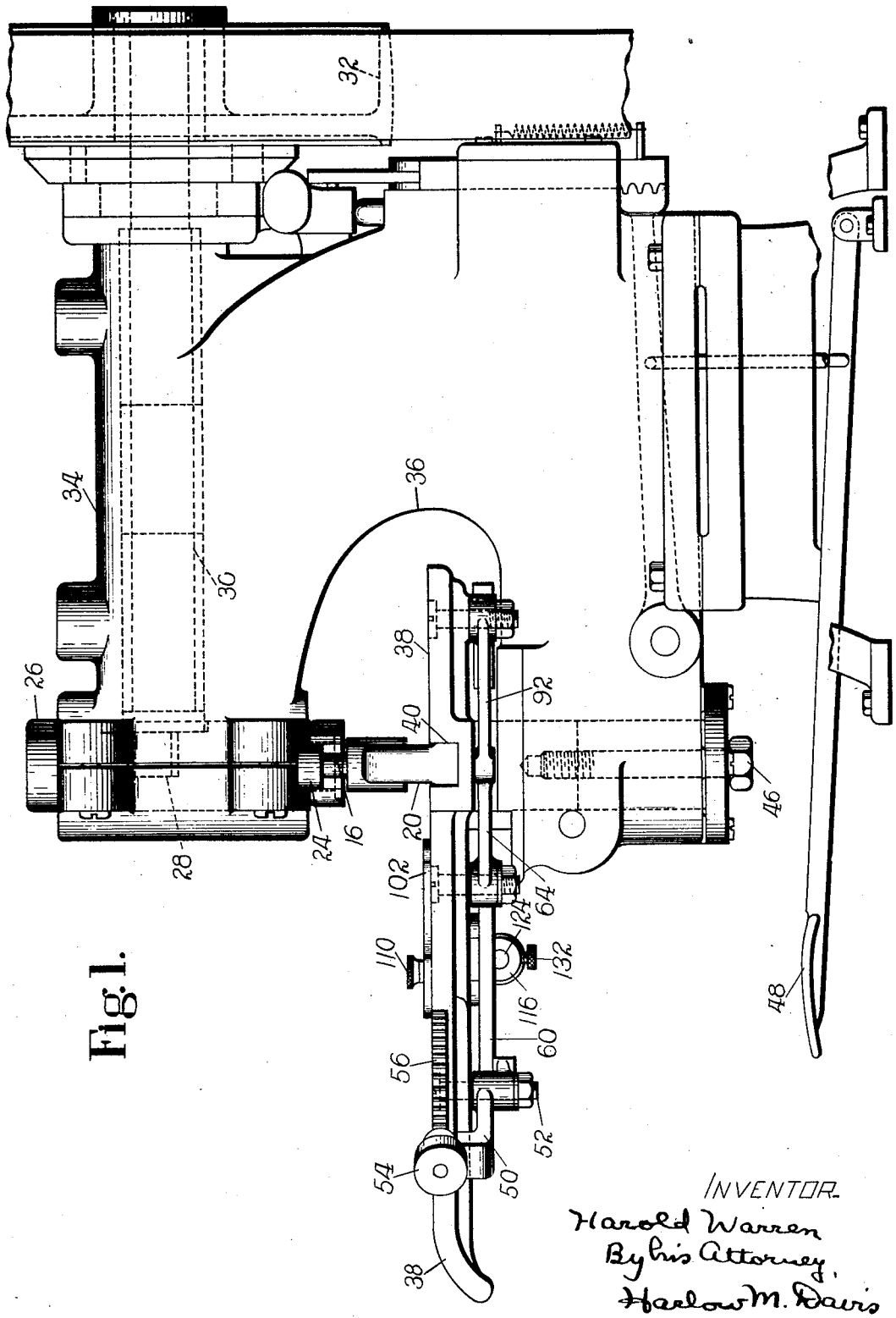
Fig. 1 is a side elevation of the machine.

The marking of the work is effected by punching a small hole 10 adjacent to each of the opposite corners of a vamp 12 or a tip 14 by means of coacting punches 16 and dies 18 mounted, respectively, in upper and lower arms of each of two U-shaped tool carriers 20. The punches are resiliently held in raised position by means of surrounding springs 22 and may be depressed by means of a striker head 24 carried upon the lower end of a plunger 26 operated in any suitable fashion, as by means of an eccentric 28 on the end of a shaft 30 operated from a drive pulley 32. Bearings for this shaft 30 are provided by means of a frame 34 of the sewing-machine type having a recess 36, and supporting upon its lower arm a work table 38 which is provided with grooves 40 slidably to receive the tool carriers 20. The grooves 40 extend transversely of the table in a line directly underneath the striker 24 so that, regardless of the position of the tool carriers, the strikers will be effective to operate the punches. The use of a tool of the punch-and-die type makes it a matter of indifference whether the striker hits exactly evenly on the two tools, and a clean cut perforation is insured. The work table 38 has a depending post 42 attached to it by means of a threaded projection 44 on the post, and this post is received in a socket in the frame 34 and held in position therein by means of a bolt 46. An operating treadle 48 is connected to a clutch mechanism of the single revolution type so that whenever the treadle is depressed the striker head will descend once to cause the work to be perforated and will then return to its raised position.

Figure 4:
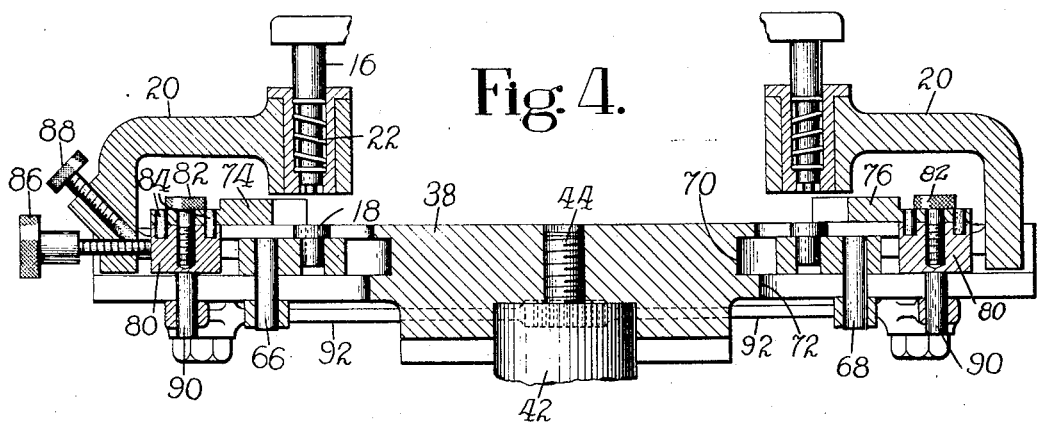
Fig. 4 is a similar section taken on the line IV—IV of Fig. 2 through the tool carriers and the gage supports.
Figure 5:
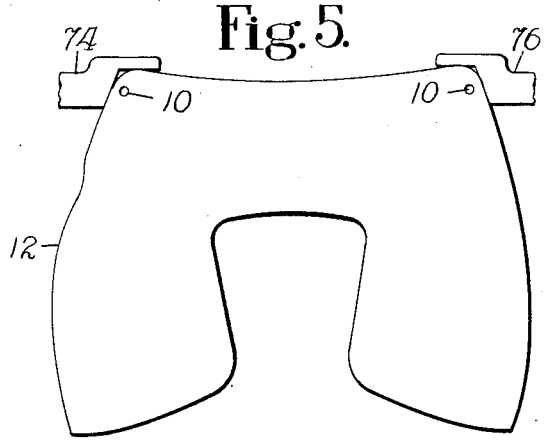
Fig. 5 shows how a short vamp may be located by notched edge gages.
Figure 6:
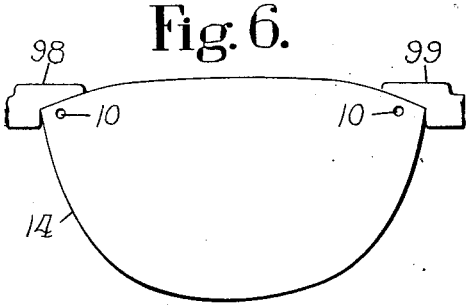
Fig. 6 shows how a tip may be located by means of differently shaped gages.

Adjustment of the position of the tool carriers for pieces of different sizes is effected by means of an operator-controlled size lever 50 pivoted below the table upon a stud 52 and provided with a spring-pressed latch 54 for engagement with the notches in a size plate 56 set into the surface of the table and held there by a spring-pressed, headed retaining member 58. By removing and replacing this notched plate 56 another one may be substituted, having its notches spaced at slightly different distances to accommodate work graded according to a different system. The inner end of the lever 50 is joined to a link 60 extending lengthwise of the table and connected by a pin to the slotted inner ends of a pair of bell cranks 62, 64, also mounted beneath the table, and interconnected for equal and opposite movement. The other ends of the bell cranks are slotted for engagement with pins 66 and 68 secured to the lower arms of U-shaped tool carriers 20, thus providing for the inward and outward movement of the punches in accordance with the position of the size lever 50. The grooves 40 in the table are undercut as shown in Fig. 4, the larger portion 70 receiving the lower arm of the U-shaped carriers 20, while the reduced lower slot 72 is of a lesser size just sufficient for the passage of the pins 66 and 68.

Figure 2:
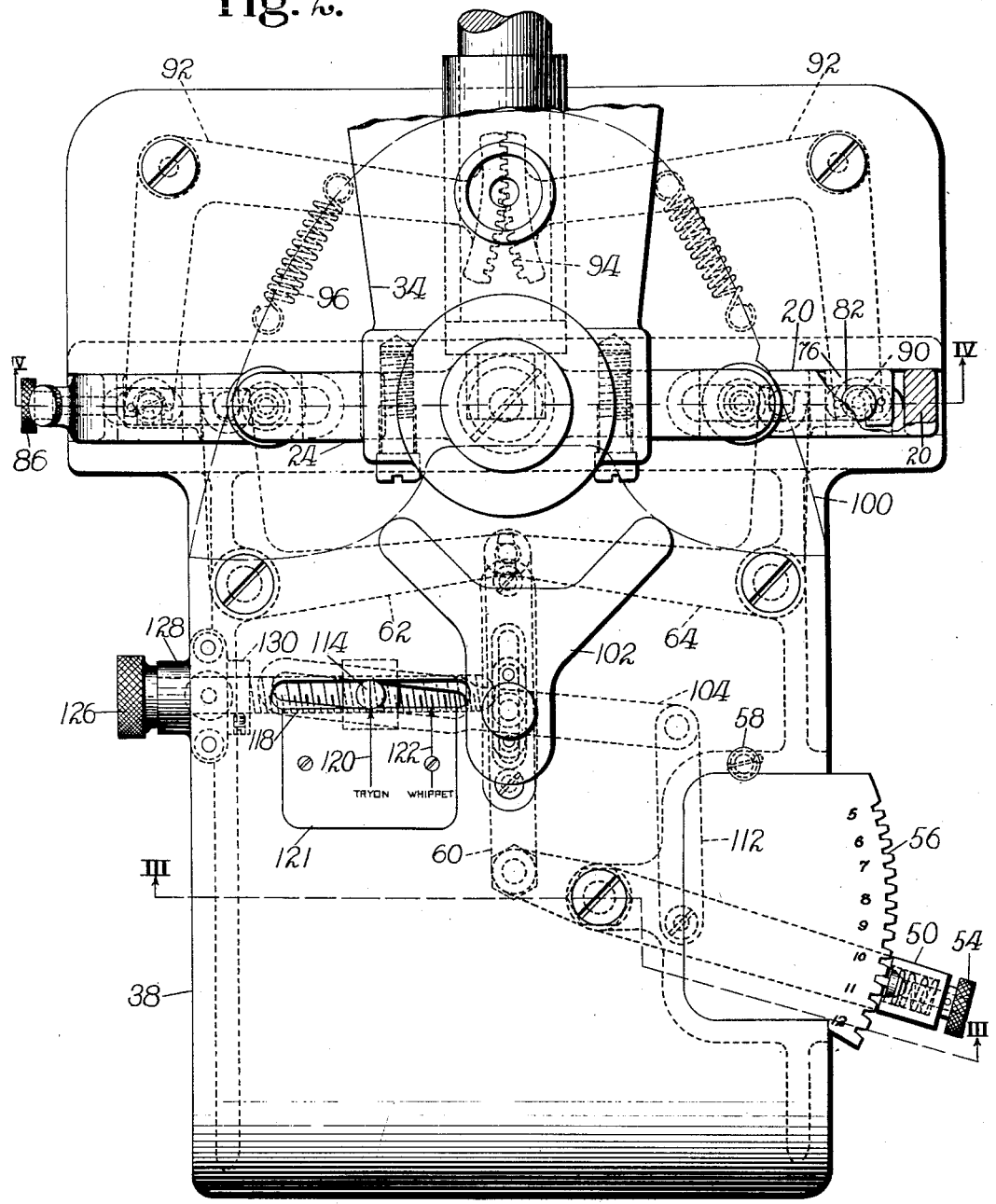
Fig. 2 is a plan view of the work table and gages with part of the head broken away.
Figure 3:
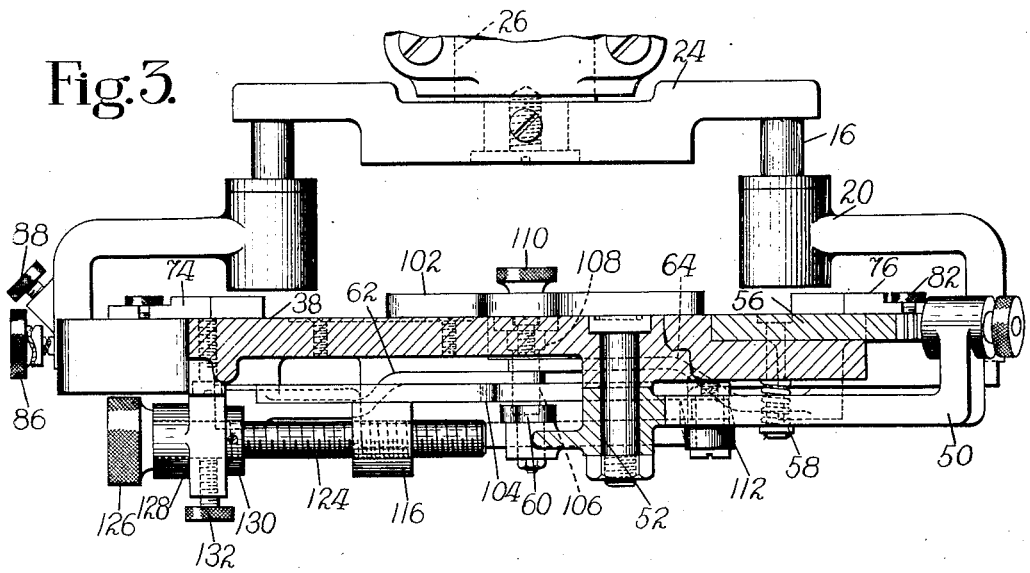
Fig. 3 is a vertical section through the work table taken on the line III—III of Fig. 2, showing the operator-controlled tool and gage adjusting mechanism.

In order to locate the work pieces with respect to the operating tools, edge gages 74 and 76 in the form of notched plates are mounted for movement with the tool carriers and are therefore retained in a predetermined position with respect to the tools, regardless of the size of the piece to be operated upon. These gages are removably positioned upon gage supports illustrated as blocks 80 which are located in slots extending longitudinally of the lower arms of the tool carriers 20 and are provided with headed retaining screws 82 adapted to enter slots in the gage plates 74, 76. The gage plates have dowel pins 84 by means of which they are exactly positioned upon the gage supports 80, and the length of the screws is such that the heads 82 engage the under sides of the upper arms of the U-shaped tool carriers before they are disengaged from the supports 80. This relieves the operator from undue care in loosening said screws when the gage plates are to be changed as she may turn the screw as far as is necessary to get the dowel pins 84 into the corresponding recesses of the gage supports 80 with assurance that the screws will not become disengaged from said supports. The gage in the left-hand tool carrier, as viewed in the drawings, is positioned with respect to that carrier by means of a stop screw 86 engaging the side of the support 80, a lock screw 88 being provided to hold the screw 86 in adjusted position. In order that the position of the other gage with respect to its carrier may be adjustably determined quickly and accurately, the gage supports have depending pins 90 entering the slotted ends of a pair of interconnected bell cranks 92 joined by curved segments 94 and each biased by a spring 96 to hold the left-hand gage-supporting block 80 against the adjusting screw 86. Thus it will be seen that the tool carriers are interconnected for equal and opposite movement, and the gages are mounted for movement with the tool carriers but are capable of independent simultaneous adjustment to take care of different allowances between the desired positions of the jig holes and the edges of the work. The gages 74 and 76 are provided with notches specially designed to locate the forward edge of a short vamp 12, and the notches are of such a shape that they engage substantial portions of the lateral sides of said vamp and only points upon the corners of the forward edge of the vamp. On the contrary, when tips such as tips 14, are to be operated upon, differently shaped gages 98 and 99 are used. These gages are shaped to engage a tip closely along the rear edge thereof and at points only along the curved forward periphery of the tip. By making the gages readily detachable, it is possible to utilize different gages having notches shaped exactly to correspond with the shape of work pieces of different styles so that the jig holes 10 may be located exactly at the desired points in said pieces. For some special types of tips, such as the tip 100 shown by broken lines in Fig. 2, the jig holes are positioned along the gently sloping sides of the curved periphery of the tip, and the gage plates are not notched but are provided with substantially straight edges. Such plates, however, are not sufficient for an accurate location of the tips in the machine, and it is accordingly necessary to provide a throat gage 102 having arms of unequal length, for the style herein illustrated, to engage points upon the rear edge of the tip such that its position with respect to the punches will be exactly determined. The distance of the forward corners of this throat gage 102 from the line interconnecting the punches is not constant but changes with a change of size. Accordingly, provision is made for movement of the throat gage 102 from front to back along the surface of the table in a direction substantially at right angles to a line connecting the punches. The amplitude of this movement of the throat gage is not equal to the amplitude of the movement of the link 60, and there has been provided an adjusting lever 104 which is pivoted to a stud 106 on the lower side of an elongated block 108 slidable in a groove in the table 38 and to which the gage 102 is attached by means of a thumb screw 110. The right-hand end of the lever 104 is connected by means of a link 112 to the operator-controlled size lever 50, while the left-hand end is slotted for engagement with a fulcrum stud or pin 114 carried on a block 116 and guided in a slot 118 on top of the table. The amplitude of the steps of movement of the throat gage 102 between successive sizes may vary according to the style of the work. Accordingly, provision is made for adjusting the fulcrum pin 114, the top of the pin being provided with a line which may be brought either to an arrow 120 marked Tryon, or another arrow 122 marked Whippet, engraved in a detachable plate 121, which names may represent two of the styles of shoes having this particular kind of a tip 100. For adjustment of the fulcrum pin 114, the block 116 is threaded on a screw 124 having a knurled head 126 and rotatably mounted in a bracket 128 secured to the underside of the table and held against axial movement therein by means of a collar 130. This screw may be locked in adjusted position by means of a thumb screw 132 and, as it is turned, it adjusts the position of the fulcrum stud 114 thereby to vary the effect of the movement of the size lever 50 upon the throat gage 102.

In the use of the machine, the operator will provide the tool carriers with proper gage plates and will adjust the screw 86 in accordance with the allowance provided on this particular work. She then will set the size lever 50 in the proper notch of the plate 56, and after bringing the work into engagement with the notches of the gage plates, will depress the operating treadle 48 to initiate an operation of the machine effective to punch the jig holes 10, which will be located with great accuracy without, however, having required the exercise of great skill upon the part of the operator. If the work is a tip of a style indicated by the line 100, then a throat gage 102 will be secured in position by the thumb screw 110, and the fulcrum stud 114 will be adjusted in accordance with the style of the shoe for which the tip is intended, by means of the knurled screw 124, it being possible for the operator properly to locate the fulcrum stud 114 by means of the marks 120 or 122 upon the detachable plate 121 secured on the top of the table.

Having described my invention, what I claim as new and desire to secure by Letters Patent of the United States is:—

1. In a machine for operating on boot and shoe parts, a work support, a pair of operating tools mounted upon the work support for in-and-out movement toward and away from each other, means for simultaneously adjusting the positions of said tools relatively to the work support, movable edge gages associated with said tools arranged for movement in and out with the tools, and means for simultaneously adjusting the positions of said gages with respect to said tools.

2. In a machine for operating on boot and shoe parts, a pair of operating tools supported for in-and-out movement toward and away from each other, means for simultaneously adjusting the positions of said tools, movable edge gages associated with said tools arranged for movement in and out with the tools, and means for simultaneously adjusting the positions of said gages with respect to said tools.

3. In a machine for operating on boot and shoe parts, a pair of operating tools supported for in-and-out movement toward and away from each other, means for simultaneously adjusting the positions of said tools relatively to each other, movable edge gages associated with said tools arranged for movement in and out with the tools, and a single operating means for equally and oppositely adjusting the positions of said gages with respect to said tools.

4. In a machine for operating on boot and shoe parts, a pair of operating tools supported for in-and-out movement toward and away from each other, means for simultaneously adjusting the positions of said tools relatively to each other, movable edge gages associated with said tools arranged for movement in and out with the tools, a throat gage, and means for simultaneously adjusting the positions of said throat gage and said tools.

5. In a machine for operating on boot and shoe parts, a pair of operating tools supported for in-and-out movement toward and away from each other, means for simultaneously adjusting the positions of said tools relatively to each other, movable edge gages associated with said tools arranged for movement in and out with the tools, a throat gage mounted for movement toward and away from said tools, means controlling the movement of said throat gage, adjustable means for determining the effect of said controlling means, and means connected to said controlling means for simultaneously adjusting the positions of said throat gage and said tools.

6. In a machine for operating on boot and shoe parts, a pair of operating tools supported for in-and-out movement toward and away from each other, means for simultaneously moving the tools to vary the distance between them, movable edge gages associated with said tools arranged for movement in and out with the tools, a throat gage mounted for movement toward and away from said tools, a lever for moving said throat gage, and means for causing simultaneous operation of the lever and the means for moving the tools.

7. In a machine for operating on boot and shoe parts, tool carriers slidably mounted for movement toward and away from each other, tools in said carriers, interconnecting means for equally and oppositely moving said tool carriers, gages slidably mounted on said tool carriers, an adjustable stop in one of said tool carriers for determining the position of the corresponding gage, equalizing means interconnecting said gages, and resilient means for holding said gage against said stop.

8. In a machine for operating on boot and shoe parts, slidably mounted tool carriers, tools in said carriers, gage carriers slidably mounted within the tool carriers for movement therewith, interconnected bell cranks for moving said tool carriers, interconnected bell cranks for moving said gages, an adjustable stop in one of said carriers for determining the position of the gages with respect to the tool carriers, resilient means for holding said gage against said stop, and means for simultaneously adjusting the positions of said tool carriers and said gages in accordance with the size of the part to be operated upon.

9. In a machine for operating on boot and shoe parts, a work table, a tool carrier slidably mounted upon the work table and comprising a U-shaped member, a tool movably mounted in the outer end of one branch of the U-shaped member, the other branch of said U-shaped member having a slot extending longitudinally thereof, a support adjustably mounted in said slot and a gage removably mounted upon the support.

10. In a machine for operating on boot and shoe parts, a U-shaped tool carrier, a tool movably supported near the free end of one arm of said U-shaped carrier, a support secured to one arm of said tool carrier, a gage removably mounted on said support, and means for retaining said gage comprising a screw, outward movement of said screw being limited by the opposite arm of the U-shaped carrier.

11. In a machine for operating on boot and shoe parts, a U-shaped tool carrier, a tool movably supported near the free end of one arm of said U-shaped carrier, a support secured to one arm of said tool carrier, a gage removably mounted on said support, dowel pins for locating said gage upon the support, and a headed screw for holding the gage on the support so positioned that it will engage the opposite arm of the U-shaped carrier before becoming disengaged from said support.

12. In a machine for operating upon boot and shoe parts, a work support, tool carriers movably mounted upon opposite sides of the central portions of the work support, punching tools mounted in the carriers, means for moving the carriers in opposite directions toward or away from each other to vary the distance between the punching tools, edge gages movable with the carriers for locating the work in operative position relatively to the tools, and means for moving the gages to vary the distance between them in accordance with variations in the size of work to be operated upon.

13. In a machine for operating on boot and shoe parts, a work table, tool carriers slidably mounted on said table for movement toward and away from each other, edge gages associated with said tool carriers, a throat gage slidably mounted on said table for movement in a direction approximately at right angles to a line interconnecting said tool carriers, and an operator-controlled lever for simultaneously adjusting the positions of said throat gage and said tool carriers.

14. In a machine for operating on boot and shoe parts, a work table, tool carriers slidably mounted on said table for movement toward and away from each other, edge gages associated with said tool carriers, a throat gage slidably mounted on said table for movement in a direction approximately at right angles to a line interconnecting said tool carriers, an operator-controlled lever for simultaneously adjusting said throat gage and said tool carrier, and means for adjustably determining the ratio of movement of the throat gage with respect to the movement of the operator-controlled lever.

HAROLD WARREN.